United States Patent
Hong et al.

(10) Patent No.: US 10,891,453 B1
(45) Date of Patent: Jan. 12, 2021

(54) METHOD OF EXAMINING THE PRODUCT INSPECTION

(71) Applicant: Rong-Der Hong, Taichung (TW)

(72) Inventors: Rong-Der Hong, Taichung (TW); Chien-Hung Lee, Taichung (TW)

(73) Assignee: Rong-Der Hong, Taichung (TW)

( * ) Notice: Subject to any disclaimer, the term of this patent is extended or adjusted under 35 U.S.C. 154(b) by 0 days.

(21) Appl. No.: 16/505,019

(22) Filed: Jul. 8, 2019

(51) Int. Cl.
*G06K 7/10* (2006.01)
*G06K 7/14* (2006.01)
*G06F 16/901* (2019.01)

(52) U.S. Cl.
CPC ....... *G06K 7/10445* (2013.01); *G06F 16/901* (2019.01); *G06K 7/1439* (2013.01)

(58) Field of Classification Search
CPC . G06K 7/0095; G06K 10/087; G06K 10/0875
USPC ......................... 235/438, 454, 385
See application file for complete search history.

(56) References Cited

U.S. PATENT DOCUMENTS

| | | | | |
|---|---|---|---|---|
| 6,381,509 B1* | 4/2002 | Thiel | ..................... | G06Q 10/06 700/115 |
| 7,243,842 B1* | 7/2007 | Leon | ................ | G07B 17/00508 235/375 |
| 2010/0305992 A1* | 12/2010 | Michalzuk | ....... | G06Q 10/06398 705/7.42 |
| 2012/0297337 A1* | 11/2012 | St. Denis | ............... | G08G 1/168 715/810 |
| 2014/0055625 A1 | 2/2014 | Smith | | |
| 2015/0369955 A1* | 12/2015 | Al-Hoshani | .......... | G01T 1/1603 378/57 |
| 2018/0179859 A1 | 6/2018 | Hunter | | |

FOREIGN PATENT DOCUMENTS

| | | |
|---|---|---|
| CN | 101533489 A | 9/2009 |
| CN | 104808052 A | 7/2015 |
| TW | 201241763 A | 10/2012 |

OTHER PUBLICATIONS

Examination Report for TW108116805, dated Jan. 20, 2020, Total of 9 pages.

(Continued)

*Primary Examiner* — Daniel St Cyr
(74) *Attorney, Agent, or Firm* — Tracy M Heims; Apex Juris, Pllc.

(57) ABSTRACT

A method of examining the product inspection is provided, which includes the following steps. Perform an inspection step multiple times to obtain the inspection data of the products, and record the inspection data in the product items in the database. The first party selects a plurality of product items from the product items in the database through the first electronic device. The data management system generates a check code corresponding to the check items, and generates a notification message. After the second party responds to the notification message through the second electronic device, the data management system determines whether the inspection data of each of the check items satisfies the corresponding check condition, and transfers the check items satisfying the check condition to the second electronic device. Thereby, it would be more convenient to examine the product inspection.

12 Claims, 7 Drawing Sheets

(56) References Cited

OTHER PUBLICATIONS

Search Report for TW108116805, dated Jan. 20, 2020, Total of 1 page.
English Abstract for CN101533489, Total of 1 page.
English Abstract for CN104808052, Total of 1 page.
English Abstract for TW201241763, Total of 1 page.
European Search Report for 19184913.2, dated Oct. 30, 2019, Total of 7 pages.

* cited by examiner

FIG.1

| Product item | basic information field group ||||| inspection data field group ||||||| check field group ||||
|---|---|---|---|---|---|---|---|---|---|---|---|---|---|---|---|
| | field F1 | field F2 | field F3 | field F4 | field F5 | field F6 | field F7 | field F8 | field F9 | field F10 | field F11 | field F12 | field F13 | field F14 | field F15 |
| P01 | DATA | DATA | DATA | DATA | DATA | DATA | DATA | DATA | DATA | DATA | DATA | DATA | R5PUT | DATA | Y |
| P02 | DATA | DATA | DATA | DATA | DATA | DATA | DATA | DATA | DATA | DATA | DATA | DATA | R5PUT | DATA | Y |
| P03 | DATA | DATA | DATA | DATA | DATA | DATA | DATA | DATA | DATA | DATA | DATA | DATA | R5PUT | DATA | Y |
| P04 | DATA | DATA | DATA | DATA | DATA | DATA | DATA | DATA | DATA | DATA | DATA | DATA | R5PUT | DATA | Y |
| P05 | DATA | DATA | DATA | DATA | DATA | DATA | DATA | DATA | DATA | DATA | DATA | DATA | R5PUT | DATA | Y |
| P06 | DATA | DATA | DATA | DATA | DATA | DATA | DATA | DATA | DATA | DATA | DATA | DATA | R5PUT | DATA | Y |
| P07 | DATA | DATA | DATA | DATA | DATA | DATA | DATA | DATA | DATA | DATA | DATA | DATA | R5PUT | DATA | Y |
| P08 | DATA | DATA | DATA | DATA | DATA | DATA | DATA | DATA | DATA | DATA | DATA | DATA | R5PUT | DATA | N |
| P09 | DATA | DATA | DATA | DATA | DATA | DATA | DATA | DATA | DATA | DATA | DATA | DATA | | DATA | |
| P10 | DATA | DATA | DATA | DATA | DATA | DATA | DATA | DATA | DATA | DATA | DATA | DATA | | DATA | |
| P11 | DATA | DATA | DATA | DATA | DATA | DATA | DATA | DATA | DATA | DATA | DATA | DATA | | DATA | |
| P12 | DATA | DATA | DATA | DATA | DATA | DATA | DATA | DATA | DATA | DATA | DATA | DATA | | DATA | |

| Product item | basic information field group | | | | | inspection data field group | | | | | | | check field group | | |
|---|---|---|---|---|---|---|---|---|---|---|---|---|---|---|---|
| | field F1 | field F2 | field F3 | field F4 | field F5 | field F6 | field F7 | field F8 | field F9 | field F10 | field F11 | field F12 | field F13 | field F14 | field F15 |
| P01 | DATA | DATA | DATA | DATA | DATA | DATA | DATA | DATA | DATA | DATA | DATA | DATA | RSPUT | DATA | Y |
| P02 | DATA | DATA | DATA | DATA | DATA | DATA | DATA | DATA | DATA | DATA | DATA | DATA | RSPUT | DATA | Y |
| P03 | DATA | DATA | DATA | DATA | DATA | DATA | DATA | DATA | DATA | DATA | DATA | DATA | RSPUT | DATA | Y |
| P04 | DATA | DATA | DATA | DATA | DATA | DATA | DATA | DATA | DATA | DATA | DATA | DATA | RSPUT | DATA | Y |
| P05 | DATA | DATA | DATA | DATA | DATA | DATA | DATA | DATA | DATA | DATA | DATA | DATA | RSPUT | DATA | Y |
| P06 | DATA | DATA | DATA | DATA | DATA | DATA | DATA | DATA | DATA | DATA | DATA | DATA | RSPUT | DATA | Y |
| P07 | DATA | DATA | DATA | DATA | DATA | DATA | DATA | DATA | DATA | DATA | DATA | DATA | RSPUT | DATA | Y |

FIG.4

| Product item | basic information field group | | | | | inspection data field group | | | | | | check field group | | |
|---|---|---|---|---|---|---|---|---|---|---|---|---|---|---|
| | field F1 | field F2 | field F3 | field F4 | field F5 | field F6 | field F7 | field F8 | field F9 | field F10 | field F11 | field F12 | field F13 | field F14 | field F15 |
| P08 | DATA | DATA | DATA | DATA | DATA | DATA | DATA | DATA | DATA | DATA | DATA | DATA | RSPUT | DATA | N |

FIG.5

| Product item | basic information field group | | | | | inspection data field group | | | | | | | | check field group | | | |
|---|---|---|---|---|---|---|---|---|---|---|---|---|---|---|---|---|---|
| | field F1 | field F2 | field F3 | field F4 | field F5 | field F6 | field F7 | field F8 | field F9 | field F10 | field F11 | field F12 | field F13 | field F14 | field F15 | field F16 | field F17 |
| P01 | DATA | DATA | DATA | DATA | DATA | DATA | DATA | DATA | DATA | DATA | DATA | DATA | R5PUT | DATA | Y | N | |
| P02 | DATA | DATA | DATA | DATA | DATA | DATA | DATA | DATA | DATA | DATA | DATA | DATA | R5PUT | DATA | Y | N | |
| P03 | DATA | DATA | DATA | DATA | DATA | DATA | DATA | DATA | DATA | DATA | DATA | DATA | R5PUT | DATA | Y | N | |
| P04 | DATA | DATA | DATA | DATA | DATA | DATA | DATA | DATA | DATA | DATA | DATA | DATA | R5PUT | DATA | Y | N | |
| P05 | DATA | DATA | DATA | DATA | DATA | DATA | DATA | DATA | DATA | DATA | DATA | DATA | R5PUT | DATA | Y | Y | 2019.05.01 |
| P06 | DATA | DATA | DATA | DATA | DATA | DATA | DATA | DATA | DATA | DATA | DATA | DATA | R5PUT | DATA | Y | Y | 2019.04.01 |
| P07 | DATA | DATA | DATA | DATA | DATA | DATA | DATA | DATA | DATA | DATA | DATA | DATA | R5PUT | DATA | Y | N | |
| P08 | DATA | DATA | DATA | DATA | DATA | DATA | DATA | DATA | DATA | DATA | DATA | DATA | R5PUT | DATA | Y | N | |
| P09 | DATA | DATA | DATA | DATA | DATA | DATA | DATA | DATA | DATA | DATA | DATA | DATA | | DATA | | | |
| P10 | DATA | DATA | DATA | DATA | DATA | DATA | DATA | DATA | DATA | DATA | DATA | DATA | | DATA | | | |
| P11 | DATA | DATA | DATA | DATA | DATA | DATA | DATA | DATA | DATA | DATA | DATA | DATA | | DATA | | | |
| P12 | DATA | DATA | DATA | DATA | DATA | DATA | DATA | DATA | DATA | DATA | DATA | DATA | | DATA | | | |

FIG.6 unchecked group :

| Product item | basic information field group | | | | | inspection data field group | | | | | | | | check field group | | |
|---|---|---|---|---|---|---|---|---|---|---|---|---|---|---|---|---|
| | field F1 | field F2 | field F3 | field F4 | field F5 | field F6 | field F7 | field F8 | field F9 | field F10 | field F11 | field F12 | field F13 | field F14 | field F15 | field F16 | field F17 |
| P01 | DATA | DATA | DATA | DATA | DATA | DATA | DATA | DATA | DATA | DATA | DATA | DATA | R5PUT | DATA | Y | N | field F17 |
| P02 | DATA | DATA | DATA | DATA | DATA | DATA | DATA | DATA | DATA | DATA | DATA | DATA | R5PUT | DATA | Y | N | |
| P03 | DATA | DATA | DATA | DATA | DATA | DATA | DATA | DATA | DATA | DATA | DATA | DATA | R5PUT | DATA | Y | N | |
| P04 | DATA | DATA | DATA | DATA | DATA | DATA | DATA | DATA | DATA | DATA | DATA | DATA | R5PUT | DATA | Y | N | |
| P07 | DATA | DATA | DATA | DATA | DATA | DATA | DATA | DATA | DATA | DATA | DATA | DATA | R5PUT | DATA | Y | N | |
| P08 | DATA | DATA | DATA | DATA | DATA | DATA | DATA | DATA | DATA | DATA | DATA | DATA | R5PUT | DATA | Y | N | | checked group:

| Product item | basic information field group | | | | | inspection data field group | | | | | | | | check field group | | |
|---|---|---|---|---|---|---|---|---|---|---|---|---|---|---|---|---|
| | field F1 | field F2 | field F3 | field F4 | field F5 | field F6 | field F7 | field F8 | field F9 | field F10 | field F11 | field F12 | field F13 | field F14 | field F15 | field F16 | field F17 |
| P05 | DATA | DATA | DATA | DATA | DATA | DATA | DATA | DATA | DATA | DATA | DATA | DATA | R5PUT | DATA | Y | Y | 2019.05.01 |
| P06 | DATA | DATA | DATA | DATA | DATA | DATA | DATA | DATA | DATA | DATA | DATA | DATA | R5PUT | DATA | Y | Y | 2019.04.01 |

FIG.7

METHOD OF EXAMINING THE PRODUCT INSPECTION

BACKGROUND OF THE INVENTION

1. Technical Field

The present invention relates generally to product inspection, and more particularly to a method of examining the product inspection.

2. Description of Related Art

In the management of common product items, scheduled maintenance is usually required. Take the management of hanging devices as an example, which include hooks, buckles, carabiners, and fall arresters, to ensure the safety of users, hanging devices must be regularly inspected. The hanging devices are able to be used only after being qualified. For companies managing considerable hanging devices, the managers have to file the inspection data for management and scheduled maintenance in an easy way.

In general, the inspection of the hanging devices is carried out by internal inspectors. However, if the hanging devices to be inspected is too numerous to deal with internally, the company has to outsource the inspection of a part of hanging devices.

Nevertheless, after the product inspection is finished, how to make the internal inspectors confirm the reliability of the outsourced product inspection is a problem to be solved.

BRIEF SUMMARY OF THE INVENTION

In view of the above, the primary objective of the present invention is to provide a method of examining the product inspection so that it would be more convenient to examine the product inspection.

The present invention provides a method of examining the product inspection, which is applied to a data management system. The data management system includes a database storing a plurality of product items corresponding to a plurality of products. An identification tag is placed on each of the plurality of products, wherein the identification tag has a tag code which is corresponding to one of the products. The method includes the following steps.

A. perform an inspection step multiple times, wherein the inspection step includes the following steps.

A1. at least an inspector reads the identification tag on one of the products by at least one tag reading device to obtain one corresponding tag code;

A2. after obtaining the tag code, transfer the tag code and the corresponding inspection data to the data management system; and A3. according to the received tag code, the data management system records the received inspection data in the product items which are corresponding to tag code.

B. provide a first electronic device connected to the data management system; the first party selects a plurality of product items from the product items in the database through the first electronic device; define the plurality of product items as a plurality of check items.

C. the data management system generates a check code which is corresponding to the check items, and generates a notification message which is corresponding to the check code.

D. provide a second electronic device connected to the data management system; the second party responds to the notification message through the second electronic device.

E. the data management system obtains the check items from the database according to the check code which is corresponding to the notification message that is responded by the second party, and then examines the inspection data of the check items; if the examined inspection data of each check items satisfies the corresponding check condition, the data management system transfers the check items satisfying the check condition to the second electronic device.

By the abovementioned steps, after the product inspection is finished, the first party selects and transfers the product items of the inspected products to the second party. Afterward the second party can know if the first party inspects the products accurately by comparing the check conditions. Thereby, it would be more convenient to examine the product inspection.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
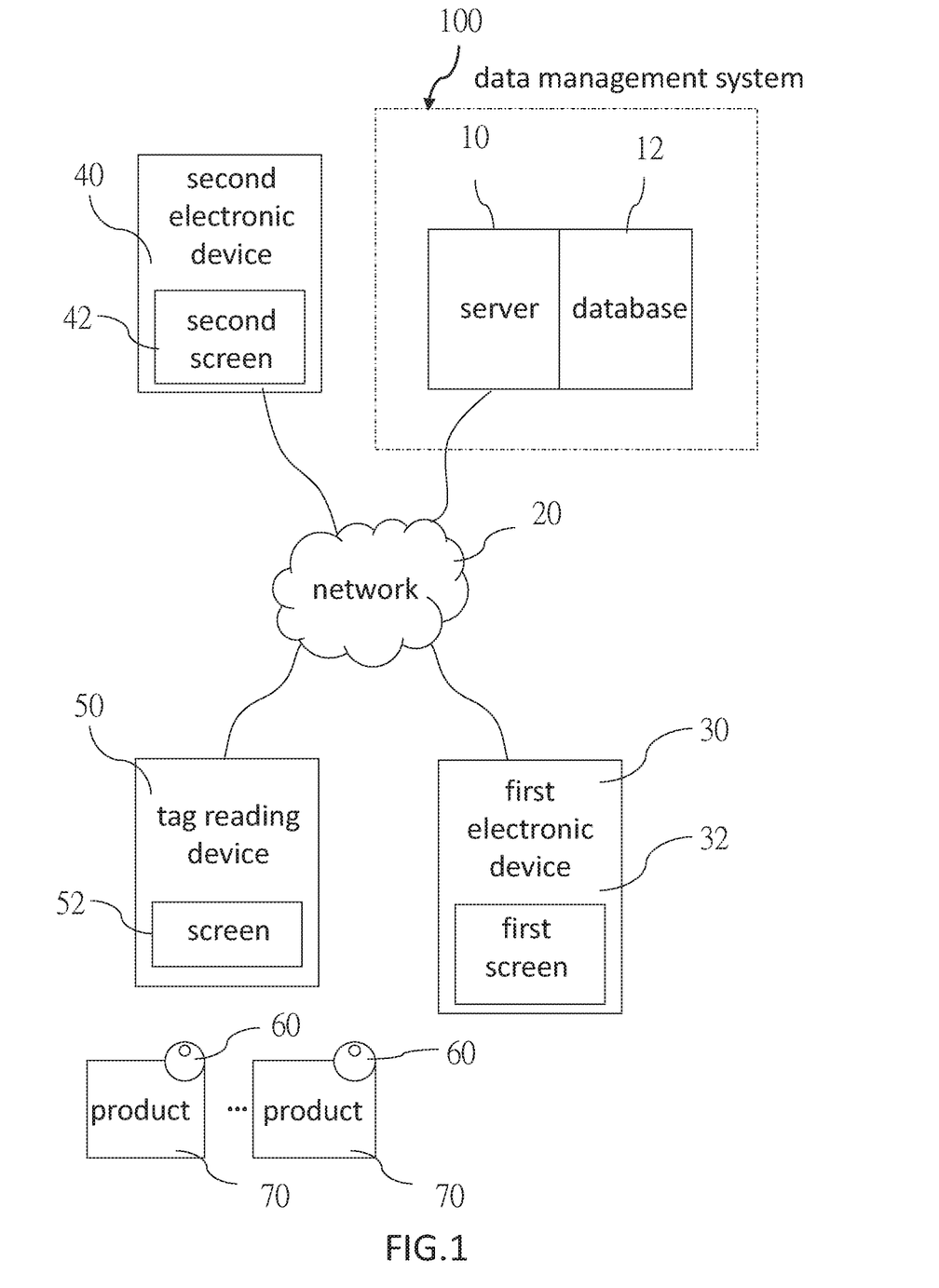
FIG. 1 is a schematic diagram of the data management system and the connection structure thereof, to which the first preferred embodiment of the present invention is applied.

As shown in FIG. 1, a data management system 100 and the connection structure thereof, to which the first preferred embodiment of the present invention is applied, are illustrated. The data management system 100 includes a server 10 and a database 12, wherein the server 10 is connected to the database 12. The server 10 is connected to a first electronic device 30, a second electronic device 40, and at least a tag reading device 50 through a network 20 in a wired or wireless manner. The network 20 could be local area network or Internet. The first electronic device 30 and the second electronic device 40 could be computers, smart phones, or tablets, which are networkable equipment. The first electronic device 30 has a first screen 32, and the second electronic device 40 has a second screen 42 for displaying data. The tag reading device 50 could be a computer, a smart phone, or a tablet, which is networkable and furthermore has a tag reading module. The tag reading device 50 is provided for reading a plurality of identification tags 60 which are placed on a plurality of products 70 respectively; each of the identification tags 60 has a tag code which is corresponding to one of the products 70. Different identification tags 60 have different tag codes. The identification tag 60 can be a non-contact data carrier, such as an RFID tag, and the tag reading module is a corresponding RFID reading module. In practice, the identification tag 60 can be a one-dimensional code or two-dimensional code, and the tag reading module is a photographic module.

In the abovementioned embodiment, the first electronic device 30 and the tag reading device 50 are operated by members of a first party, while the second electronic device 40 is operated by members of a second party. The first party is the inspection unit, while the second party is the owner of the products; the second party outsources the product inspection to the first party.

Figure 2:
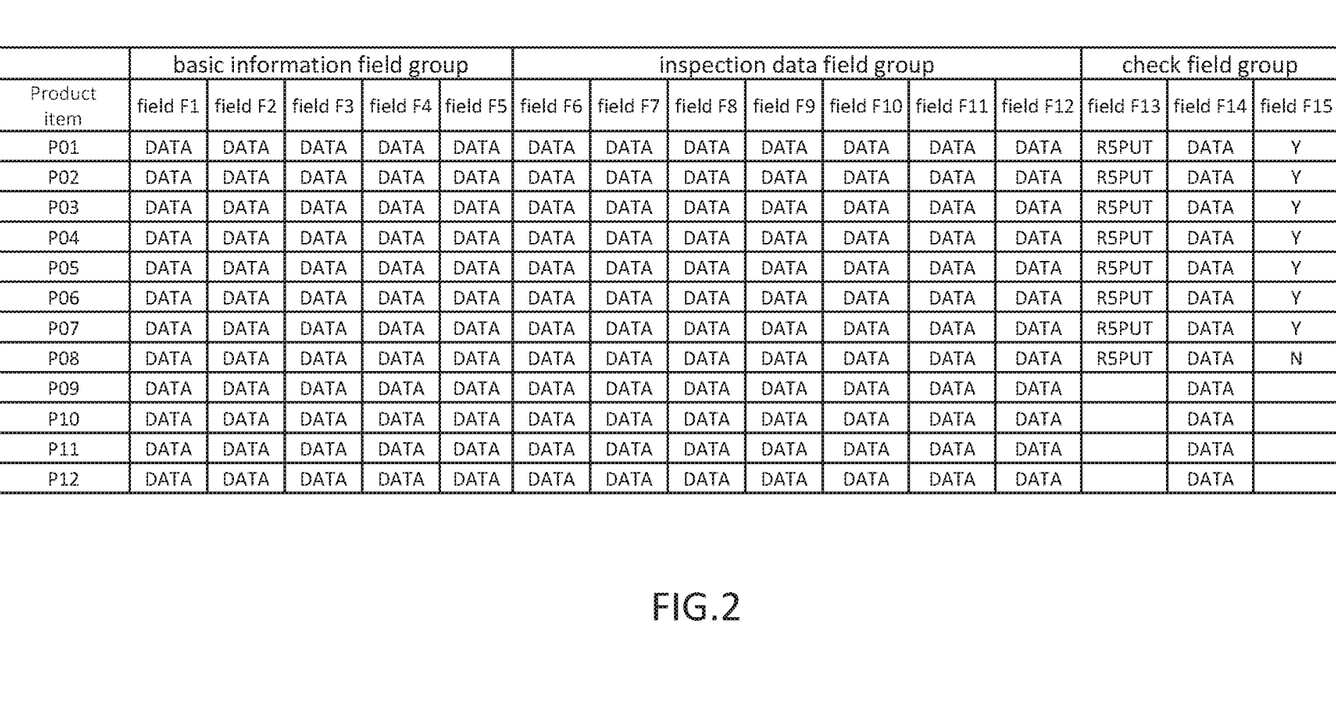
FIG. 2 is a schematic diagram of the database of the first preferred embodiment.

As shown in FIG. 2, the database 12 contains data from product items P01 to P12 which are corresponding to the products 70 respectively. The second party delegates inspection data editing authority of product items P01 to P12 to the first party. The server 10 is provided to process the data in the database 12. In this embodiment, the products 70 corresponding to the product items P01 to P12 are hanging devices such as hooks, buckles, carabiners, and fall arresters. The data of each of the product items P01 to P12 contains a plurality of fields (field F1 to field F15) which include a basic information field group (field F1 to field F5), an inspection field group (field F6 to field F12), and a check field group (field F13 to field F15). Furthermore, the basic information of the product items P01 to P12 are recorded in the basic information field group (field F1 to field F5). For example, the product name is recorded in field F1, the product number is recorded in field F2, the tag code of the identification tag is recorded in field F3, the product location information is recorded in field F4, and the manager is recorded in field F5. Content recorded in fields F1 to F5 are represented as "DATA". By the tag code recorded in field F3, each identification tag can be corresponding to one of the product items P01 to P12 and one of the products 70.

The inspection data of product items are recorded in the inspection field group (field F6 to field F12). For example, the scheduled inspection period of the product is recorded in field F6; the scheduled inspection period of different product items P01 to P12 can be the same or different; each of the scheduled inspection period has a start date and an expiration date, and the product 70 can be used only if the product 70 is inspected within the scheduled inspection period and qualified. The inspector is recorded in field F7, the inspection standard is recorded in field F8, the inspection date is recorded in field F9, the location information of the inspection location is recorded in field F10, the inspected part is recorded in field F11, and the qualified status is recorded in field F12. Content recorded in fields F6 to F12 are represented as "DATA".

Additionally, the check field group (field F13 to field F15) is provided for recording the check information of the product items. For example, field F13 is a check code field which is provided for recording check codes, wherein the function of the check code will be described later. Field F14 is provided for recording check conditions; content recorded in field F14 is represented as "DATA". Field F15 is provided for recording whether the product items satisfy the corresponding check conditions ("Y" represents that the product item satisfies the check condition, and "N" represents that the product item doesn't satisfy the check condition, while blank means unchecked).

The aforementioned field groups and the number of fields are only examples rather than limitations on the present invention. The database 12 shown in FIG. 1 of the first preferred embodiment is independent of the server 10. However, this is not a limitation on the present invention. In other words, the database 12 and the server 10 could be integrated into a host.

Figure 3:
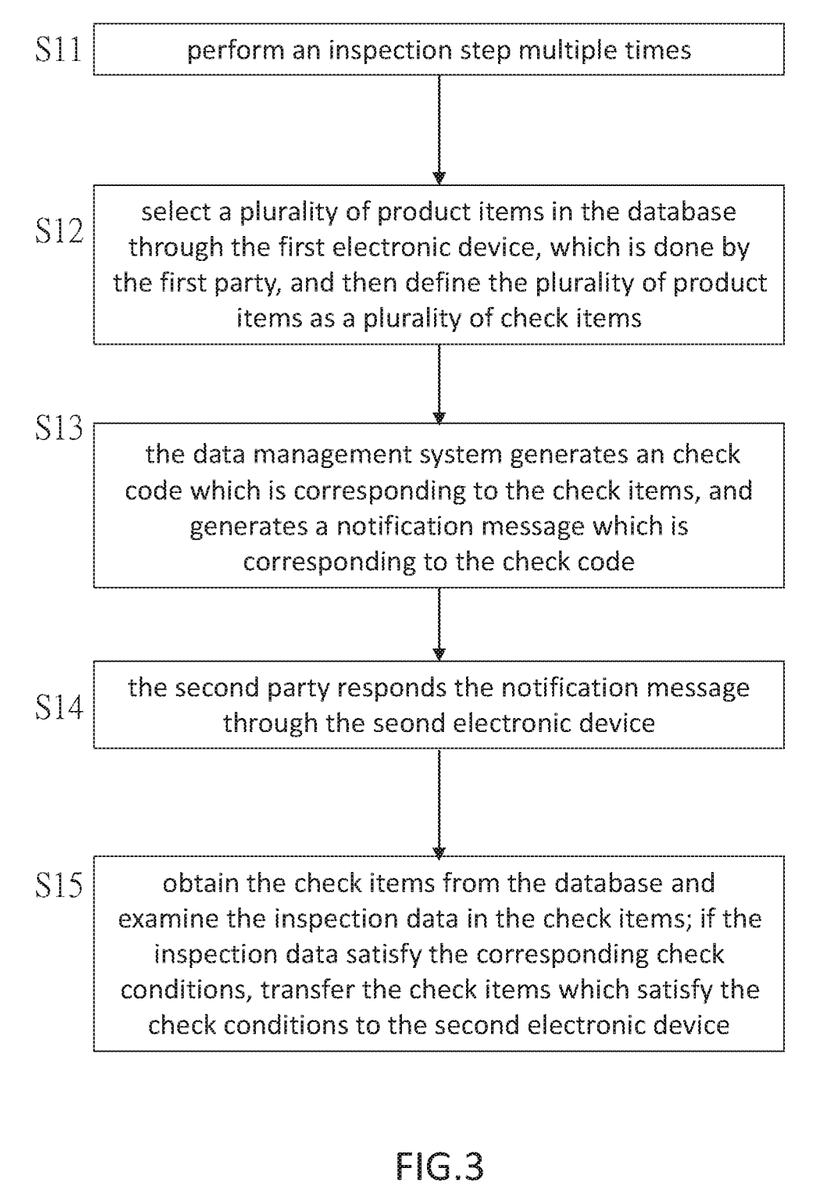
FIG. 3 is a flow chart of the first preferred embodiment of the present invention.

By the above structure, a method of examining the product inspection in this embodiment includes the following steps shown in FIG. 3.

Step S11: perform an inspection step multiple times, wherein the inspection step is provided to obtain the inspection data of one of the products 70 to be inspected. The inspection step includes the following steps.

Step S111: an inspector of the first party reads the identification tag 60 on one of the products 70 by the tag reading device 50 to obtain the corresponding tag code. In this embodiment, the inspector heads for where the one of the products 70 is located, and reads the identification tag 60 on the product by the tag reading device 50, and then stores the obtained tag code to the tag reading device 50.

Step S112: after obtaining the tag code, transfer the tag code and the corresponding inspection data to the data management system 100. In this embodiment, the inspector inspects the product 70 with the inspection standard, such as visual inspections and loading tests that meet safety regulations. After the inspection is finished, enter inspection data into the tag reading device 50, and then the tag reading device 50 transfers the tag code and the inspection data to the server 10. The inspection data includes at least one of inspector, inspection date, location information of the inspection location, inspected part, and qualified status, or any combination thereof. The abovementioned inspection data can be entered by the inspector into the tag reading device 50; or alternatively, the tag reading device 50 automatically selects a part of the inspection data. For example, the inspector information can be obtained by reading the identity code of the inspector; the inspection date can be generated by the system time of the tag reading device 50; the location information of the inspection location can be generated according to a localization signal received by the tag reading device 50 from, e. g., GPS or network.

Because the inspection standard is recorded in field F8 of the inspection data field group in each of the product items P01 to P12 in the database 12, the tag reading device 50 can transfer the obtained tag code to the server 10 of the data management system 100 first; the server 10 searches for the content of the inspection standard in field F8 in the corresponding product items P01 to P12 from the database 12 according to the tag code, and next transfers the inspection standard to the tag reading device 50 as well as displays it on the screen 52 thereof. Thereby, the inspector will know the inspection standard of the product 70 and can carry out the inspection accordingly.

Practically, the inspector can enter the tag code and the inspection data into the first electronic device 30 as well.

Step S113: according to the received tag code, the data management system 100 records the received inspection data in the product items P01 to P12 corresponding to tag code. In this embodiment, the inspection data (inspector, inspection date, location information of the inspection location, inspected part, and qualified status) are recorded in corresponding fields F7 and F9 to F12 of the inspection data field group.

After performing step S11 multiple times, multiple different products 70 are inspected, and the corresponding inspection data are obtained as well as recorded in the database 12. In step S11 in this embodiment, the inspection can only be performed for a part of products 70 optionally rather than all authorized products 70. In practice, the number of the inspector and the tag reading device 50 can be plural respectively; each of the inspectors operates one of the reading devices 50 to perform step S11.

Step S12: provide a first electronic device 30 connected to the data management system 100; the first party selects a plurality of product items from the product items P01 to P12 in the database 12 through the first electronic device 30; define the plurality of product items as a plurality of check items. In this embodiment, the member of the first party operates the first electronic device 30 to connect the server 10; afterward the server 10 transfers the data of the product items P01 to P12 in the database 12 to the first electronic device 30, and the data is displayed on the first screen 32 of the first electronic device 30. Next, the member of the first party could select the product items from the product items P01 to P12 through the first electronic device 30 to the second party for examination. For example, the member of the first party selects the product items P01 to P08 from the product items P01 to P12 to the second party for examination, while other product items P09 to P12 will not be checked temporarily. The first electronic device 30 transfers the selected results to the server 10. The server 10 then defines the product items P01 to P08 as a set of a plurality of check items, and defines the product items P09 to P12 as items not to be checked temporarily.

Step S13: the data management system 100 generates a check code which is corresponding to the check items defined in step S12, and generates a notification message which is corresponding to the check code.

In this embodiment, the server 10 generates a check code corresponding to the check items (i. e., product items P01 to P08). The check code can be generated in any way, for example, randomly or according to any encoding scheme. The server 10 lists the generated check codes in the check code field (field F13) of the corresponding check items in the database 12. For example, the server generates an check code "R5PUT" corresponding to the product items P01 to P08, and lists "R5PUT" in the check code field (field F13) of the product items P01 to P08 in the database 12. In the other hand, the product items P09 to P12 are items not to be checked temporarily so that the check code field thereof (field F13) is blank. The products 70 corresponding to the product items P09 to P12 could be inspected but not to be checked in the current examination; also, the products 70 corresponding to the product items P09 to P12 could be products without inspected yet.

Next, the server 10 generates notification messages which are corresponding to the check codes respectively. The member of the first party can select one of the notification messages from the server 10, and sends the selected notification message to the second party. The sent notification message can be in the form of a message module in the server 10; after being connected to the server 10 through the second electronic device 40, the second party can receive the notification message. Or alternatively, the notification message can also be a hyperlink transmitted to the outside by email or the communication software; once receive and click the hyperlink, the second party will link to the message module in the server 10 and get the notification message.

Step S14: provide the second electronic device 40 connected to the data management system 100; the second party responds to the notification message through the second electronic device 40. In this embodiment, the member of the second party is connected to the server 10 through the second electronic device 40 and enters the message module in the server 10 for responding to the notification message.

Step S15: the data management system 100 obtains the check items (i. e., product items P01 to P08) from the database 12 according to the check code which is corresponding to the notification message that is responded by the second party, and then examines the inspection data of the check items. If the examined inspection data of the check items satisfy the corresponding check conditions, the data management system 100 transfers the check items satisfying the check conditions to the second electronic device 40.

In this embodiment, after the server 10 confirms that the second party responds to the notification message, the server 10 compares the check code which is corresponding to the notification message with the check code field (field F13) of the product items P01 to P12 in the database 12 for screening and obtaining the check items (i. e., product items P01 to P08). For example, the server 10 screens and selects the corresponding check items (i.e., product items P01 to P08) from the database 12 according to check code "RSPUT". The server 10 examines the content of part of the fields of the inspection data field group in the check items so as to determine whether the inspection data entered by the first party satisfies the check conditions of acceptance. The corresponding content "Y" is recorded in field F15 of the check field group if the check item satisfies the check conditions, and the corresponding content "N" is recorded in field F15 of the check field group if the check item doesn't satisfy the check conditions.

The check conditions of different products 70 can be the same or different. The check conditions of each of the products 70 can be pre-established and stored in field F14 in corresponding product items P01 to P12 by the second party in any of the steps; for example, be connected to the data management system 100 through the second electronic device 40 or the other electronic devices to establish the check conditions.

The check conditions include comparing the scheduled inspection period, and the check condition is considered to be satisfied if the inspection date of the product items P01 to P12 fall within the scheduled inspection period; or alternatively, the check conditions include comparing the product location information, the check condition is considered to be satisfied if the location information of the inspection location of the product items P01 to P12 are in accordance with the product location information. Certainly, the check conditions can include comparing both the scheduled inspection period as well as the product location information, and the check condition is considered to be satisfied if not only the inspection date of the product items fall within the scheduled inspection period but also the location information of the inspection location of the product items are in accordance with the product location information.

For example, the product items P01 to P07 satisfy the check conditions so that "Y" is recorded in field F15 thereof, while the product item P08 doesn't satisfy the check conditions so that "N" is recorded in field F15 thereof.

Figure 4:
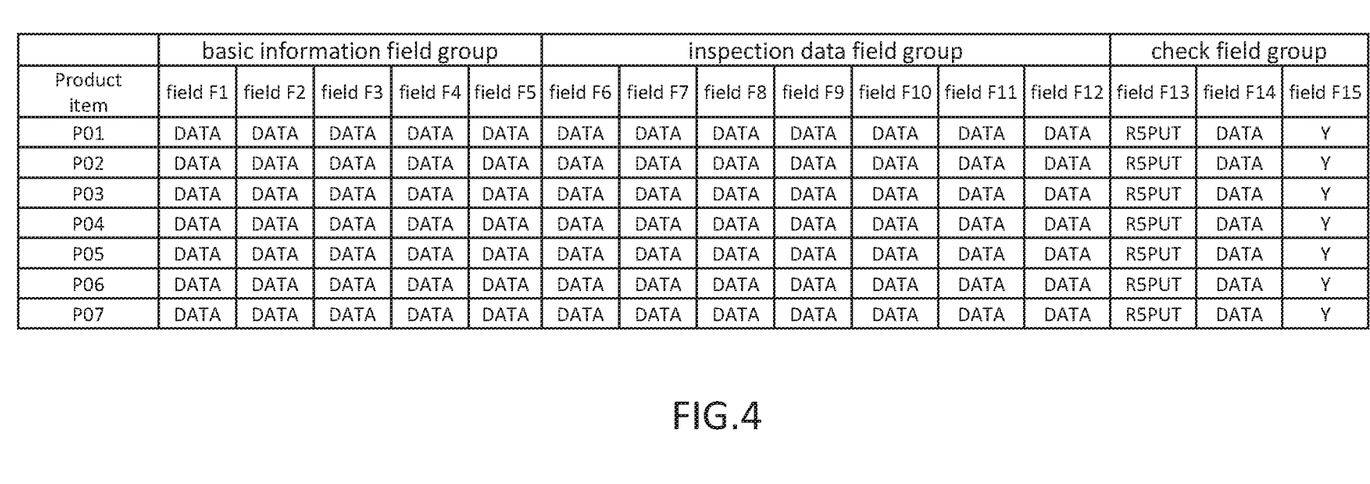
FIG. 4 is a schematic diagram of the check items which satisfy the check conditions and are transferred to the second electronic device of the first preferred embodiment.

The server 10 afterward transfers the check items whose field F15 with "Y" recorded (i. e., product items P01 to P07) to the second electronic device (as shown in FIG. 4), and displays the check items on the second screen.

Figure 5:
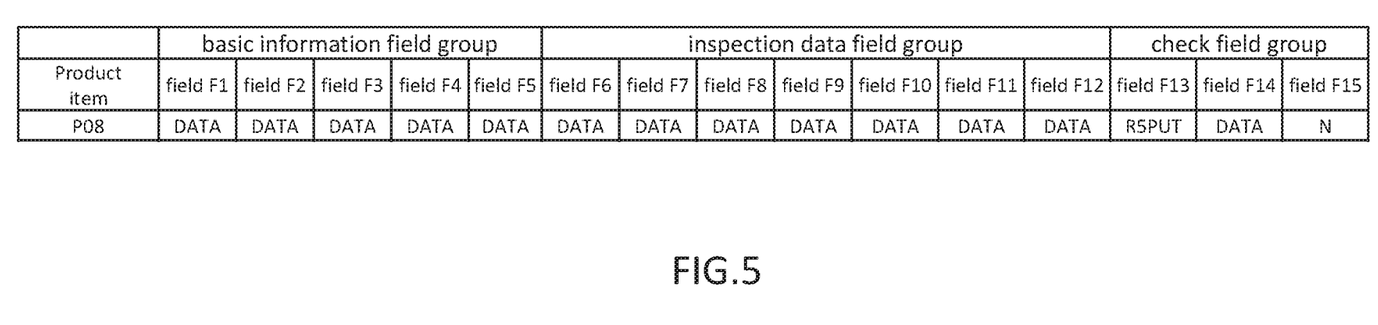
FIG. 5 is a schematic diagram of the check items which don't satisfy the check conditions and are transferred to the second electronic device of the first preferred embodiment.

By abovementioned steps S11 to S15, the inspection unit (first party) can select and transfer the product items P01 to P12 of the inspected products 70 to the product owner (first party) for examination. Moreover, the owner of the products 70 can also know if the first party inspects the products 70 accurately. Therefore, the examination of the product inspection is more convenient. Furthermore, the owner of the products 70 can pay the first party according to the check items that satisfy the check conditions. Besides, in step S15, the server 10 can also transfer the check items that don't satisfy the check conditions (i. e., product item P08) to the second electronic device (as shown in FIG. 5), and display the check items on the second screen 42, which informs the second party of the check items that don't satisfy the check conditions. The server 10 of the data management system 100 also transfers the check items that don't satisfy the check conditions to the first electronic device 30, and thereby informs the first party of the check items that don't satisfy the check conditions.

Figure 6:
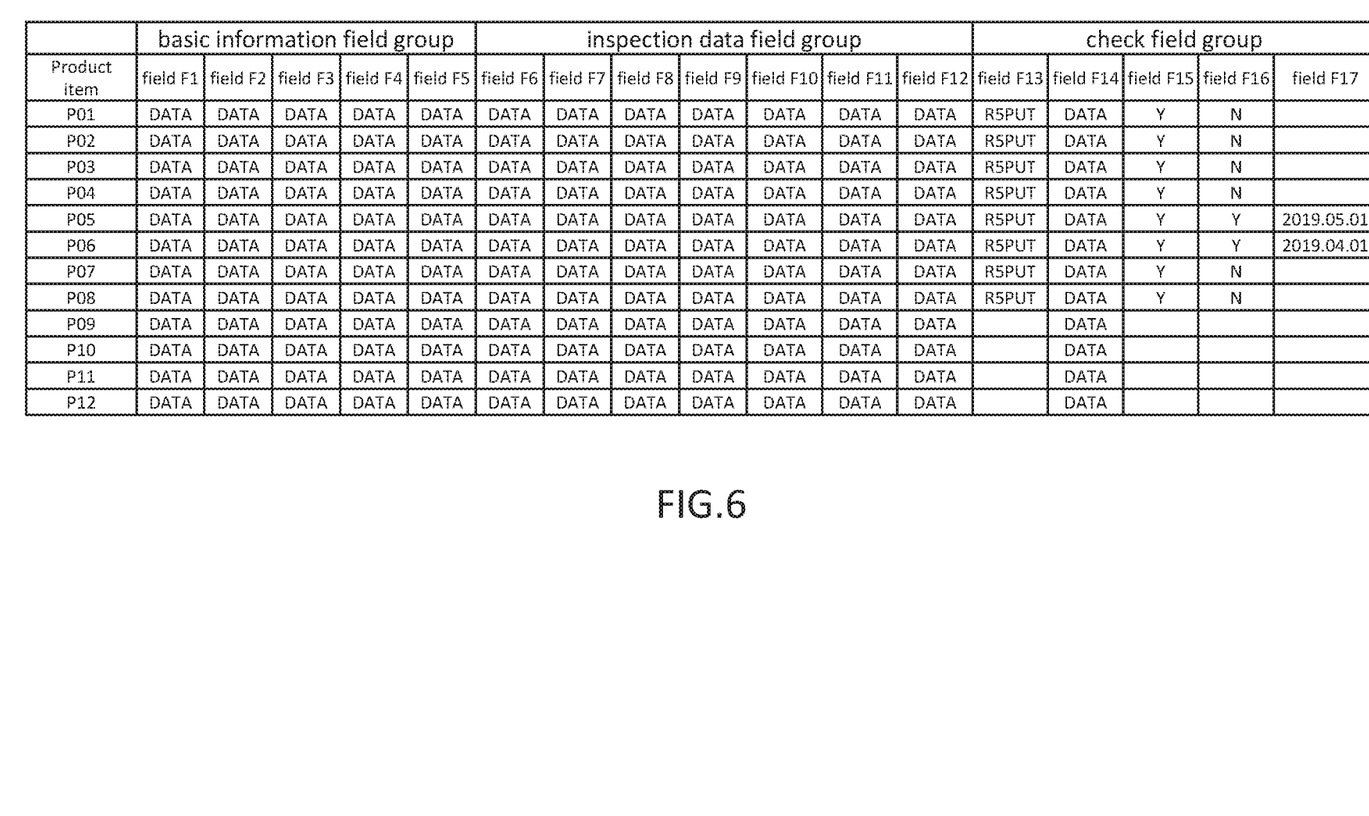
FIG. 6 is a schematic diagram of the database of the second preferred embodiment.

As shown in FIG. 6, the product items P01 to P12 in the database of the second preferred embodiment of the present invention are based on the first preferred embodiment. The check field group of each of the product items P01 to P12 further includes an examined status field (field F16) and an examination date field (field F17). Field F16 is provided for recording whether the product items P01 to P12 have been examined before ("Y" represents the product items have been examined, while "N" represents the product items haven't been examined). F17 is provided for recording the previous examination date of the product items P01 to P12, wherein the format of the examination date is, for example, "year (AD). month. date". The product item P08 in FIG. 6 satisfies the check conditions.

Figure 7:
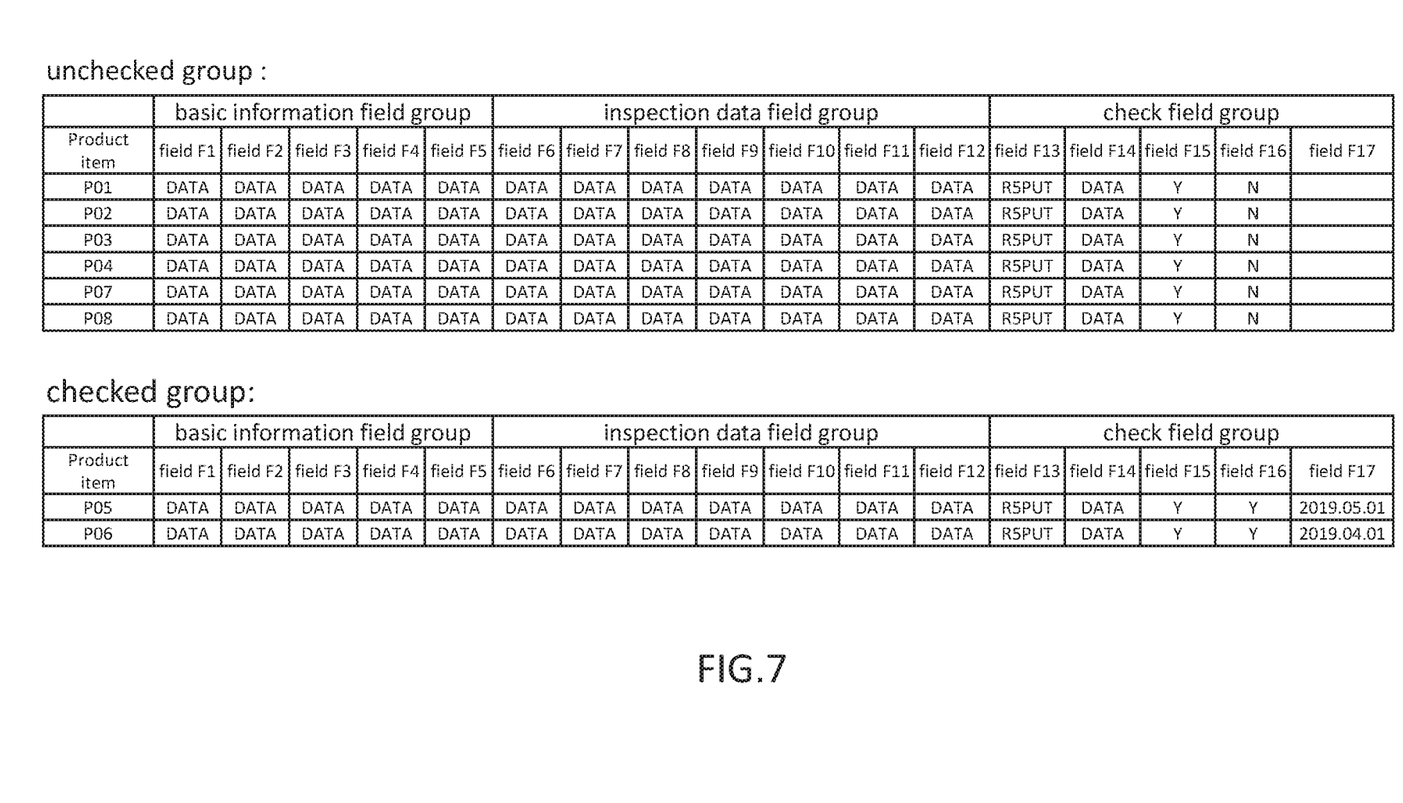
FIG. 7 is a schematic diagram of the check items transferred to the second electronic device of the second preferred embodiment.

The method of examining the product inspection of this embodiment is based on the steps in the first embodiment. Step S15 further includes the steps of dividing the check items which are transferred to the second electronic device 40 into two groups according to the content of the examined status field (field F16); one of the two groups is an unchecked group, while another group is a checked group (referring to FIG. 7). In addition, the divided groups can be displayed on the second screen 42 to inform the second party of part of check items that have been checked (examined) as well as the previous examination date thereof.

Moreover, the second party can pay the first party according to the check items in the unchecked group.

Additionally, Step S15 further includes the steps that the data management system 100 transfers a reminder message the second electronic device 40. The reminder message is provided for reminding that a part of the check items has been checked (examined), which informs the second party that a part of the check items has been checked already. The reminder message can be transferred to the first electronic device 30 to inform the first party.

Thereby, the product items that have been checked before will not be re-checked, e. g., avoid repeat payments.

After confirming that the check item has been checked, the second party can set field F16 as examined in the database of the data management system 100, and record the examination date in field F17. When re-performing steps S11 to S15, it is known that whether there is repeated examination.

The embodiments described above are only preferred embodiments of the present invention. All equivalent methods which employ the concepts disclosed in this specification and the appended claims should fall within the scope of the present invention.

What is claimed is:
1. A method of examining the product inspection, which is applied to a data management system comprising a database storing a plurality of product items which are corresponding to a plurality of products, wherein an identification tag is placed on each of the plurality of products; the identification tag has a tag code which is corresponding to one of the products; the method comprises the steps of:
   A. performing an inspection step multiple times, wherein the inspection step comprises the steps of:
      A1. reading the identification tag on one of the products by at least a tag reading device to obtain one corresponding tag code, which is performed by at least an inspector;
      A2. after obtaining the tag code, transferring the tag code and a corresponding inspection data to the data management system; and
      A3. according to the received tag code, recording the received inspection data in the product items which are corresponding to tag code, which is performed by the data management system;
   B. providing a first electronic device connected to the data management system; selecting a plurality of product items from the product items in the database through the first electronic device, which is performed by the first party; defining the plurality of product items as a plurality of check items;
   C. generating a check code which is corresponding to the check items, and generating a notification message which is corresponding to the check code, which are performed by the data management system;
   D. providing a second electronic device connected to the data management system; responding to the notification message through the second electronic device, which is performed by the second party; and
   E. obtaining the check items from the database according to the check code which is corresponding to the notification message that is responded by the second party, and then examining the inspection data of the check items, which are performed by the data management system; if the examined inspection data of each of the check items satisfies a check condition corresponding to each of the check items, transferring the check items satisfying the check condition to the second electronic device, which is performed by the data management system.

2. The method of claim 1, wherein step E further comprises the step of:
   transferring the check items whose inspected inspection data don't satisfy the check condition to the second electronic device.

3. The method of claim 2, wherein step E further comprises the step of:
   transferring the check items whose inspected inspection data don't satisfy the check condition to the first electronic device.

4. The method of claim 1, further comprises the step of:
   establishing the check condition of each of the products, and storing the check condition in the product items corresponding to the products in the database, which are performed by the second party.

5. The method of claim 1, wherein in step A2, the inspection data comprises an inspection date; in step E, the check condition comprises comparing a scheduled inspection period, and the check condition is considered to be satisfied if the inspection date falls within the scheduled inspection period.

6. The method of claim 5, wherein in the step A2, the inspection data comprises a location information of the inspection location; in step E, the check condition comprises comparing a product location information, and the check condition is considered to be satisfied if the inspection date falls within the scheduled inspection period as well as if the location information of the inspection location is in accordance with the product location information.

7. The method of claim 6, wherein step A1 further comprises the step of:
  receiving a localization signal which is received by at least a tag reading device; generating the location information of the inspection location according to the localization signal.

8. The method of claim 1, wherein in step A2, the inspection data comprises a location information of the inspection location; in step E, the check condition comprises comparing a product location information, and the check condition is considered to be satisfied if the location information of the inspection location is in accordance with the product location information.

9. The method of claim 1, wherein each of the product items comprises an examined status, and each of the examined status represents whether each of the product items has been examined; step E further comprises the step of transferring a reminder message to the second electronic device, which is performed by the data management system; the reminder message is provided for reminding that a part of the check items has been examined.

10. The method of claim 9, wherein step E further comprises the step of transferring the reminder message to the first electronic device, which is performed by the data management system.

11. The method of claim 1, wherein each of the product items comprises an examined status which represents whether each of the product items has been examined; step E further comprises the step of dividing the check items which are transferred to the second electronic device into two groups according to the content of the examined status; one of the two groups is checked, while another group is unchecked.

12. The method of claim 1, wherein each of the product items in the database comprises an inspection standard; step A2 further comprises the steps of:
  transferring the received tag code to the data management system, which is performed by the at least a tag reading device;
  searching for the inspection standard in the corresponding product items from the database according to the tag code, and next transferring the inspection standard to the tag reading device, which are performed by the data management system.

* * * * *